July 25, 1961   E. M. BOAT   2,993,280
RIGHT ANGLE DIAL BORE GAGE
Filed Dec. 10, 1957   2 Sheets-Sheet 2
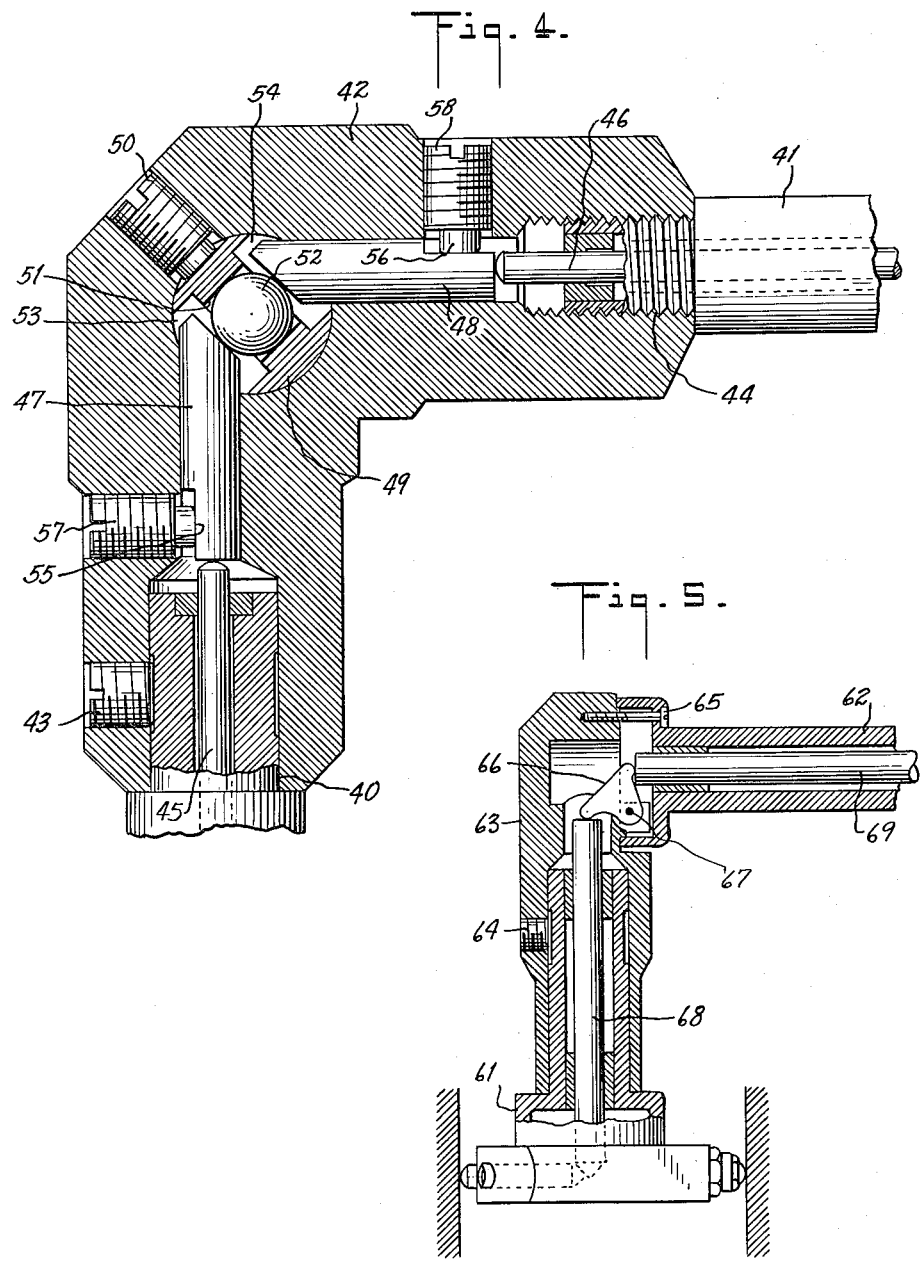
INVENTOR.
EARL M. BOAT
BY Darby + Darby
ATTORNEYS 2,993,280
RIGHT ANGLE DIAL BORE GAGE
Earl M. Boat, Poughkeepsie, N.Y., assignor to Standard Gage Company, Inc., Poughkeepsie, N.Y., a corporation of New York
Filed Dec. 10, 1957, Ser. No. 701,808
3 Claims. (Cl. 33—178)

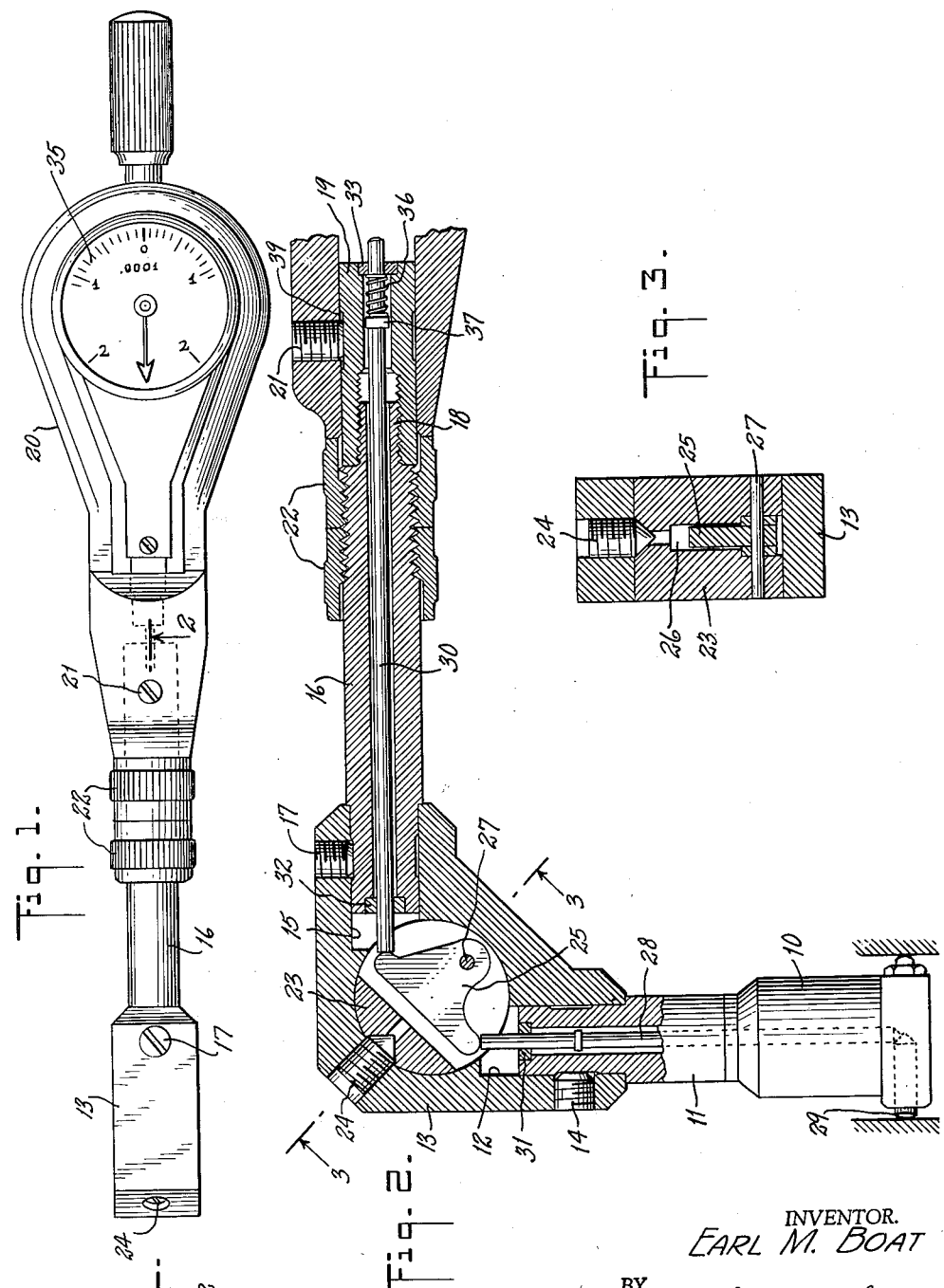

The present invention relates to bore gages, and particularly to dial bore gages in which the indication is given by the position of a pointer or hand on a cooperating dial.

More particularly still this invention relates to a form of dial bore gage in which the cooperating dial mechanism is at an angle of about 90° to the longitudinal axis of the bore to be measured and to the longitudinal axis of the gaging head.

In the past it proved inconvenient and time consuming, if not sometimes impossible, to gage holes with a conventional dial bore gage where the space in front of the bore to be measured was limited, such as by a tool turret on a machine. Often such a hole had to be gaged in other manners, as by the use of small plug gages which is oftentimes an unsatisfactory method of measuring a bore due to reliance on a sense of "feel" by the operator. In boring or internal grinding operations especially with jig borers and grinders where close tolerances are required, a great deal of time is consumed by the operator in backing his tool spindle sufficiently away from the work piece to insert a conventional bore gage into the bore the many times required during the cutting operation.

The main object of the present invention is to provide a dial bore gage capable of being used in bores where a minimum of space is available in front of the bore to give fast, accurate measurements of the bore.

A further object of the present invention is to provide a dial bore gage that allows measuring of holes with a minimum of space in front of the hole and yet allows easy zero adjustment of the dial indicator.

Another object of the present invention is to provide a dial bore gage that allows easy visibility of the indicator dial by the operator at all times regardless of the position of the bore to be measured and even during 180° rotation of the gage while in the bore.

A still further object of the present invention is to provide a dial bore gage which shall be simple and sturdy in construction yet accurate in results, and which can be readily and economically manufactured and serviced.

Other objects and features of the invention will be apparent when the following description is considered in connection with the annexed drawings, in which FIG. 1 is a plan view of the dial indicator bore gage;

FIG. 2 is a cross-sectional view on the plane of line 2—2 of FIG. 1;

FIG. 3 is a sectional view on the plane of line 3—3 of FIG. 2;

FIG. 4 shows a modification of the present invention; and

FIG. 5 shows a further modification.

Referring now to the drawings, the bore gage comprises a conventional gaging head unit 10, well known in the art, to which is attached a sleeve 11, which sleeve extends into bore 12 of right angle housing 13 and is held in position by means of a setscrew 14 which is threaded into the wall of the housing and bears against the said sleeve. At right angles to the longitudinal axis of said bore 12 in housing 13 is a second bore 15 which is adapted to receive sleeve 16, which sleeve is held in position by setscrew 17. The remote end of sleeve 16 is provided with a bushing 19 threaded to the reduced portion 18 of sleeve 16. A housing 20 is adjustably fixed in position on bushing 19 by means of setscrew 21. Bushing 19 has a recess 39 on its outer peripheral surface for engagement by the setscrew 21 to avoid marring the bearing surface between the bushing 19 and the housing 20. Recess 39 is of a sufficient width to allow relative longitudinal movement of the setscrew 21 in the said recess. Threaded on the outer periphery of sleeve 16 are lock nuts 22 one of which abuts against the end of housing 20 and serves to stop the housing in an adjusted position with respect to the sleeve 16 and thus to position the plunger of the dial indicator relative to the cooperating movement transmitting member, in order to care for variations between gaging heads.

Extending transversely through housing 13 and intersecting the longitudinal axes of bores 12 and 15 is a removable cylindrical plug 23, held in position by means of setscrew 24, which plug has an axial slot 26 cut in the plug's body as best seen in FIG. 3. Cylindrical plug 23 has a generally triangular bell crank lever 25 pivoted on pin 27 in slot 26.

Extending through the internal bore of the gaging head 10 and through the bore of the sleeve 11 is a movement transmitting rod 28 which is guided in said bores by bushings such as indicated at 31 in sleeve 11.

The lower end of rod 28, positioned in the gaging head 10, terminates in a 45° bevel which cooperates in a well known manner with a similar 45° bevel at the end of measuring plunger 29 which is slidably mounted in a radial bore in gaging head 10. The upper end of transmitting rod 28 abuts one arm or apex of lever 25. Extending freely through a centrally located bore in sleeve 16 is a movement transmitting rod 30 which is guided in said bore by a sliding fit within bushings 32 and 33. One end of rod 30 abuts the second arm or apex of lever 25, and has its other end bearing against the usual plunger of the dial indicator 35 so that any movement of rod 30 is effective to cause a corresponding indication of the dial indicator. Rod 30 is kept in contact with lever 25 by means of a compression spring 36 which extends between the inner surface of the bushing 33 and collar 37 fixed to rod 30.

Thus it is seen that any inward movement of measuring plunger 29 causes a corresponding movement of rod 28 which bears against one arm of lever 25 and transmits a corresponding movement to rod 30 bearing against the plunger of the dial indicator 35 resulting in actuation of the indicator to give an indication of the diameter of the bore being measured.

The zero adjustment of the dial indicator can be easily and quickly varied in the present invention by means of lock nuts 22 threaded on the outer periphery of sleeve 16 and abutting housing 20. Lock nuts 22 are loosened and housing 20 moved with respect to sleeve 16 so that the variation between gaging heads may be compensated for as mentioned hereinabove. Lock nuts 22 are then tightened "jamming" the threads and locking the parts in their adjusted positions. It is seen that rod 30 will now be positioned to bear against the plunger of indicator 35 to give a desired reading, especially a zero reading. In addition to this adjustment the dial indicator may be also set to a zero reading by the usual rotation of the dial and bezel ring.

Referring now to FIG. 4, there is shown another form of this invention wherein reduced portions of sleeves 40 and 41 extend partially into housing 42 at right angles to each other and are retained in position by lock screw 43 and threaded connection 44 respectively.

Extending freely through the internal bores of said sleeves 40 and 41 are movement transmitting rods 45 and 46 respectively. Slidably positioned in housing 42 are extension rods 47 and 48 axially aligned with and abutting the movement transmitting rods 45 and 46 respectively. Extending transversely through housing 42 is a removable cylindrical plug 49 held in position by setscrew 50. The plug has a bore 51 in which a sphere 52 is positioned with the bore 51 being provided with a counterbore 53 or 54 at either end. Counterbores 53 and 54 are of such dimensions as to provide clear movement of the extension rods 47 and 48 respectively as they contact sphere 52. The faces of the said extension rods contacting sphere 52 are beveled at a 45° angle as indicated in the drawing.

In order to retain the extension rods 47 and 48 in their respective bores, limit the movement and prevent rotation thereof, the extension rods are provided with flat surfaces 55 and 56 respectively and shouldered screws 57 and 58 are inserted into tapped holes of housing 42 bearing lightly against the flat surfaces 55 and 56 respectively. By this arrangement it is possible to readily assemble the extension rods into the housing and retain the rods in the housing while limiting the movement thereof, both translatory and rotational. It is thus seen that an upward movement of rod 45 will be transmitted through extension rod 47, which in turn urges sphere 52 with rolling contact against extension rod 48, moving rod 46, which in turn moves the indicator plunger giving a reading on the dial of the indicator.

A further modification of the present invention is shown in FIGURE 5 wherein standard components of conventional bore gages are used allowing conversion of a conventional bore gage to a right angle gage. Sleeves 61 and 62 are components of conventional bore gages and easily interchangeable with each other. Sleeve 61 is slidably received in housing 63 and adjustably positioned therein by setscrew 64. Sleeve 62, at right angles to said sleeve 61, is fastened to housing 63 by screws 65. Housing 63 has a generally triangular bell crank lever 66 pivoted on pin 67, the lever arms intersecting the longitudinal axes of sleeves 61 and 62. Slidably positioned within the bores of sleeves 61 and 62 are movement transmitting rods 68 and 69 respectively, each abutting an arm of lever 66.

In a generally similar way, as described above, movement of rod 68 is correspondingly transmitted to rod 69 actuating the plunger of the dial indicator.

It will be seen that due to the use of my construction the measuring unit assembly of a bore gage unit may be inserted into a bore where there is limited space in front of the bore and yet quick, accurate readings can be obtained by an indicator attached to the bore gage. An indicator bore gage has been provided that can measure bores that formerly could not be measured by conventional dial bore gages.

Looking at FIG. 2 it will be seen that by loosening lock screw 14 and rotating sleeve 11 the measuring gage can be easily rotated 180° for a full measurement of the bore while the dial indicator is kept stationary in view of the operator.

While I have described preferred embodiments of my invention it will be understood that many other modifications may be made without deviating from the spirit of my invention. I wish therefore to be limited not by the foregoing description but, on the contrary, solely by the claims granted to me.

What is claimed is:
1. In a right angle bore gage, in combination, a measuring head of generally cylindrical shape having a measuring plunger mounted in a radial bore therein and a motion transmitting rod cooperating with said measuring plunger and mounted for movement along the axis of said measuring head, an elbow shaped housing having a pair of bores at right angles to each other, means mounting the end of said cylindrical measuring head remote from said measuring plunger in one of said bores, a dial indicator, a housing for said indicator, a sleeve fixed to said indicator housing and forming an extension thereof, a second motion transmitting rod mounted in said sleeve and cooperating with the plunger of said dial indicator, means mounting the end of said sleeve in the second bore of said housing, a pair of transmitting rod extensions, one mounted in each of said bores, said extensions terminating in 45° bevels facing each other, and means comprising a spherical body between said beveled terminations of said extensions for transmitting movement from one of said transmitting rod extensions to the other to thereby transmit movement from the transmitting rod associated with the measuring head to the transmitting rod associated with the dial indicator.

2. A right angled bore gage in accordance with claim 1 wherein a third bore is provided in said elbow shaped housing, said third bore extending at right angles to said pair of bores with its center line intersecting the intersection of the center lines of said pair of bores, a plug is mounted in said third bore and a bore extends through said plug at a 45° angle to said pair of bores, said spherical body being mounted in the plug bore.

3. In a right angle bore gage, in combination, a measuring head of generally cylindrical shape having a measuring plunger mounted in a radial bore therein and a first motion transmitting rod cooperating with said measuring plunger and mounted for movement along the axis of said measuring head, and elbow shaped housing having a pair of bores at right angles to each other and a third bore transverse to said pair of bores and intersecting said pair of bores at their intersection, means mounting the end of said cylindrical measuring head remote from said measuring plunger in one of said pair of bores, a dial indicator having a housing, a sleeve fixed to said indicator housing and forming an extension thereof, a second motion transmitting rod mounted in said sleeve and cooperating with the plunger of said dial indicator, means mounting one end of said sleeve in the second of said pair of bores of said elbow shaped housing and means for transmitting movement from said first motion transmitting rod to said second motion transmitting rod, said means comprising a triangular shaped bell crank lever, two of the apices of said lever bearing against the adjacent ends of said first and second motion transmitting rods respectively, a plug mounted in said third bore of said elbow shaped housing and means pivotally mounting said bell crank lever in said plug.

References Cited in the file of this patent
UNITED STATES PATENTS
2,581,473     Eisele _____ Jan. 8, 1952
FOREIGN PATENTS
238,163     Switzerland _____ Oct. 1, 1945
573,859     Great Britain _____ Dec. 10, 1945